(12) United States Patent
Qi et al.

(10) Patent No.: US 9,998,901 B2
(45) Date of Patent: Jun. 12, 2018

(54) AUGMENTING WI-FI DEVICE DISCOVERY WITH NETWORK CONNECTION INFORMATION

(71) Applicant: INTEL CORPORATION, Santa Clara, CA (US)

(72) Inventors: Emily H. Qi, Camas, WA (US); Ganesh Venkatesan, Hillsboro, OR (US); Carlos Cordeiro, Portland, OR (US); David J. McCall, Dallas, TX (US)

(73) Assignee: INTEL CORPORATION, Santa Clara, CA (US)

( * ) Notice: Subject to any disclaimer, the term of this patent is extended or adjusted under 35 U.S.C. 154(b) by 10 days.

(21) Appl. No.: 14/483,341

(22) Filed: Sep. 11, 2014

(65) Prior Publication Data
US 2015/0172905 A1    Jun. 18, 2015

Related U.S. Application Data

(60) Provisional application No. 61/916,407, filed on Dec. 16, 2013.

(51) Int. Cl.
*H04W 8/00* (2009.01)
*H04L 29/08* (2006.01)
*H04W 76/02* (2009.01)

(52) U.S. Cl.
CPC ....... *H04W 8/005* (2013.01); *H04L 29/08396* (2013.01); *H04L 67/1061* (2013.01); *H04W 76/023* (2013.01)

(58) Field of Classification Search
CPC .................... H04W 8/005; H04W 76/023; H04L 67/1061; H04L 29/08396
See application file for complete search history.

(56) References Cited

U.S. PATENT DOCUMENTS

| | | | | |
|---|---|---|---|---|
| 2013/0179605 A1* | 7/2013 | Huang | ............... | H04L 65/4092 710/20 |
| 2013/0227152 A1* | 8/2013 | Lee | ....................... | H04W 48/16 709/227 |
| 2013/0281020 A1* | 10/2013 | Montemurro | ....... | H04W 76/026 455/41.2 |
| 2014/0091987 A1* | 4/2014 | Lee | ....................... | H04L 65/00 345/2.3 |
| 2014/0219194 A1* | 8/2014 | Varoglu | ............. | H04W 76/043 370/329 |
| 2014/0351445 A1* | 11/2014 | Davidson | ............ | H04L 65/1069 709/227 |
| 2015/0163842 A1* | 6/2015 | Kalhan | ................. | H04W 8/005 455/500 |

(Continued)

*Primary Examiner* — Redentor Pasia

(57) ABSTRACT

Disclosed herein are techniques to enable discovery of P2P capable devices and associated network connection information. In some embodiments, an information element is included in a transmitted request to indicate a request for network connection information from another wireless device. The device may respond with indications of the requested network connection information. Network connectivity capability determined from the network connection information may be used to decide whether to setup a Wi-Fi Direct link or a Tunneled Direct Link Setup (TDLS), or whether to use an AP infrastructure link with the other device.

23 Claims, 6 Drawing Sheets

(56) References Cited

U.S. PATENT DOCUMENTS

2015/0257191 A1* 9/2015 Kim .................. H04W 4/005
                                                    370/329
2015/0341976 A1* 11/2015 Choi .................. H04B 5/0031
                                                    455/41.1

* cited by examiner

AUGMENTING WI-FI DEVICE DISCOVERY WITH NETWORK CONNECTION INFORMATION

RELATED CASES

This application claims the benefit of U.S. Provisional Application Ser. No. 61/916,407 filed Dec. 16, 2013, entitled "Wi-Fi Device and Method to Augment Wi-Fi Device Discovery with Network Connection Information," which application is incorporated herein by reference in its entirety.

TECHNICAL FIELD

Embodiments described herein generally relate to wireless communications and in particular to Wi-Fi Direct Services.

BACKGROUND

Many modern devices include wireless networking capabilities. In particular, many devices include various communication and networking abilities that provide for establishing a direct connection between two or more devices. For example, Wi-Fi Direct provides a peer-to-peer (P2P) connectivity to allow users to connect their devices in an easy and convenient manner to share, show, print, and synchronize content. In some instances, devices with Wi-Fi Direct capability can use Probe Request frame and Probe Response frame to discover Wi-Fi devices in the proximity. Subsequently, the Wi-Fi Direct capable device can use P2P Service Discovery Query/Response frames to find devices supporting Wi-Fi Direct from the discovered devices and particularly to find devices supporting desired services (e.g., audio streaming, video streaming, file transfer, or the like). In some instances, a device may use Layer 3 Protocol Service Discovery Request/Response frames to find devices supporting desired services through an access point (AP) infrastructure link. Once a Wi-Fi Direct device finds another device with desired services, the Wi-Fi Direct device can setup a P2P connection.

However, in many use cases (e.g., residential) personal devices and customer equipment (CE) devices are typically always connected to an AP (e.g., a home router, or the like). Due to being connected to an AP, some of these devices may not have a spare network interface to establish a P2P connection in addition to the connection to the AP.

DETAILED DESCRIPTION

The present disclosure is generally directed to providing for a first P2P capable wireless device to discover information about a second P2P capable wireless device's network connectivity capability. Using such network connectivity capability information, the first device can decide what type of P2P connection to establish with the second device. Additionally, the first device can determine a pathway to use to establish the P2P connection. For example, based on the network connectivity capability information, the first device can decide whether is should establish a Wi-Fi Direct link, a Tunneled Direct Link Setup (TDLS), or an AP infrastructure link with the second device.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments of the present disclosure may be included with or implemented by devices configured to operate in accordance with various wireless network standards. In some examples, these wireless network standards may include standards promulgated by the Wi-Fi Alliance, the Institute of Electrical Engineers (IEEE), or other standard setting organizations. With a particularly illustrative example, some embodiments may be implemented in accordance with the Wi-Fi Alliance, *Wi-Fi Peer-to-Peer* (P2P) *Technical Specification*, v1.1 2011 standard.

Figure 1:
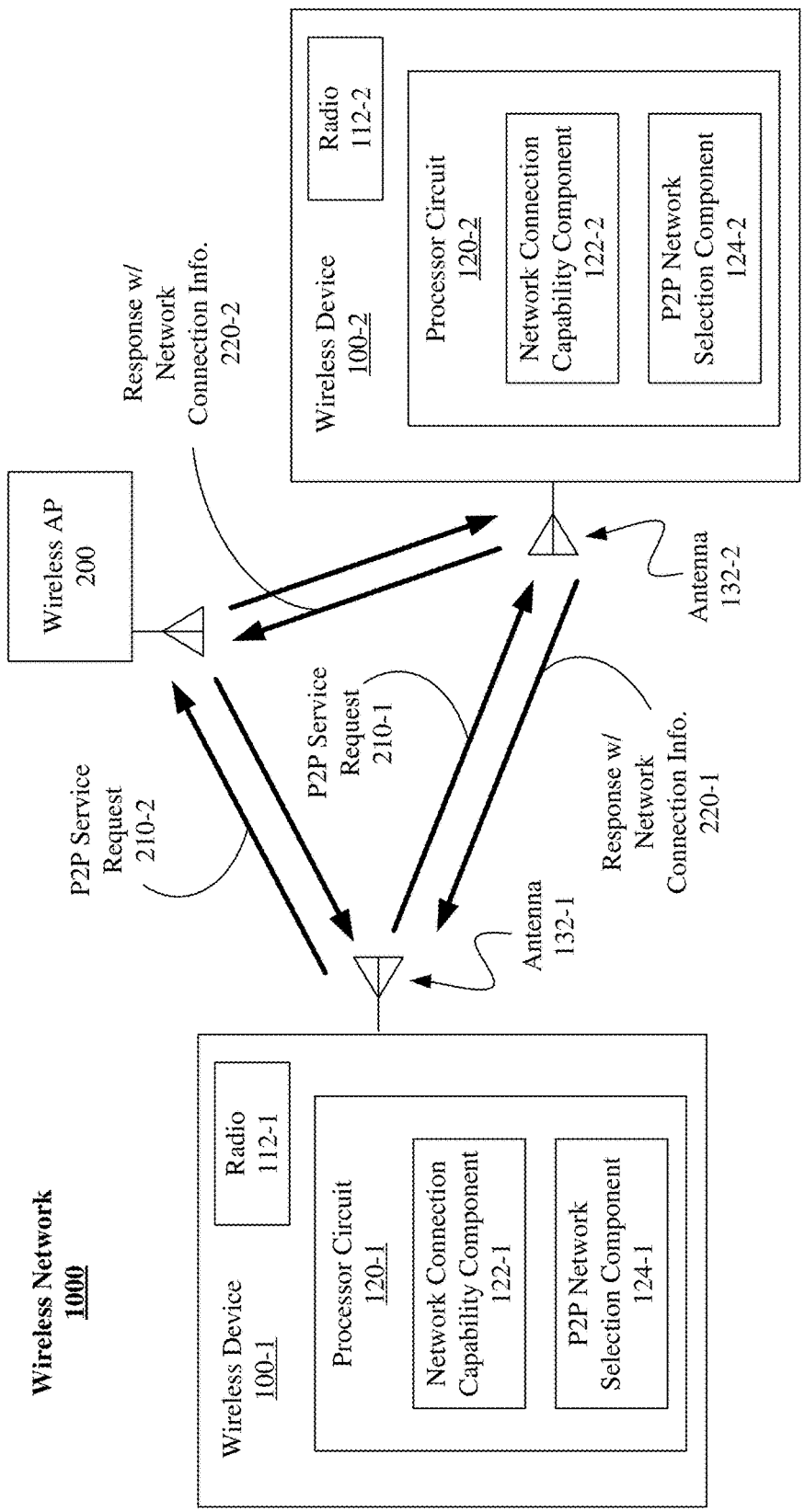
FIG. 1 illustrates one embodiment of a peer-to-peer network.

FIG. 1 illustrates a wireless network 1000. The network 1000 includes wireless devices 100-*a*, where "a" is a positive integer. In particular, wireless devices 100-1 and 100-2 are shown. However, it is to be appreciated, that any number of wireless devices 100-*a* may be implemented, and the number of devices depicted is merely shown at a quantity to facilitate understanding. During operation, the wireless device 100-1 is configured to discover the P2P connection capability and services of the wireless device 100-2, including determining the network connection capabilities of the wireless device 100-2 for purposes of establishing a P2P network with the wireless device 100-2.

In general, the devices 100-*a* may be any computing device and/or communication device configured to connect in a P2P network. For example, the devices 100-*a* may be a smart phone, a tablet computer, a laptop computer, an ultrabook computers, a desktop computer, a television, a media streaming device, a game console, an Internet connected television, a DVD player, a wearable computing device, or the like. In a particularly illustrative example, the wireless device 100-1 may be a smartphone while the wireless device 100-2 may be a media streaming device. It is important to note, that although the devices 100-*a* are depicted and referenced as "wireless" devices, some implementations may accommodate P2P connections between wireless and/or wired devices.

Each of the devices 100-*a* includes a radio 112-*a*. In general, the radios 112-*a* may be any radio configured to communicate wirelessly, such as, for example, Wi-Fi, WiGig, Bluetooth, ZigBee, or the like. Furthermore, each of the devices 100-*a* includes an antenna (or antenna array) 132-*a*. Additionally, each of the devices 100-*a* includes a processor circuit 120-*a* operably coupled to the radio 112-*a*.

In some examples, the processor circuit 120-*a* may be an application processor of the device 100-*a*. In some examples, the processor circuit 120-*a* may be a baseband processor of the device 100-*a*.

Each of the devices 100-*a* also includes a network connection capability component 122-*a* and a P2P network selection component 124-*a*. The network connection capability component 122-*a* and the P2P network selection component 124-*a* may comprise programming, functions, logic, parameters, and/or other information operative to implement particular capabilities for the devices 100-*a*. In some examples, the components 122-*a* and 124-*a* are executable by the processing circuit 120-*a*.

Furthermore, in some examples, the wireless network 1000 may include a wireless access point (AP) 200. It is to be appreciated, that the wireless AP may be any of a variety of APs (e.g., router, range extended, base station, or the like) configured to facilitate access to the wireless network 1000 and/or the Internet (not shown).

During operation, the devices 100-1 and 100-2 may communicate signals (e.g., P2P service request 210-*a*, response with network connection information 220-*a*, or the like) including indications of network connection capabilities in order to establish a P2P network. Based on these signals the devices 100-1 and 100-2 may establish a P2P network using a network connection path determined based on the network connection capabilities communicated in the response 220-*a*.

It is to be appreciated, that the devices 100-1 and 100-2 may communicate signals with each other directly (e.g., with request/response 210-1/220-1) or indirectly, such as, for example through the AP 200 (e.g., with request/response 210-2/220-2). Furthermore, it is to be appreciated that either device 100-1 or 100-2 may initiate discovery of other P2P capable devices and associated network connection capability information. However, for purposes of clarity of presentation, the device 100-1 is described in the context of initiating discovery of the device 100-2 and it's associated network connection capability information. However, examples are not to be limited in this context.

The network connection capability component 122-1 transmits the request 210-*a*, which is a request to discover P2P network capabilities and services. The request 210-*a* includes an indication that a response (e.g., the response 220-*a*) to the request is to include network connection capability information, the network connection capability information including an indication of one or more network connection capabilities of the P2P device associated with the response (e.g., the device 100-2).

In some examples, the network connection capability component 122-2 receives the request 210-*a*, determines one or more supported network connection capabilities, and generates the response 220-*a*. The response includes the network connection capability information, including an indication of the network connection capabilities supported by the P2P device associated with the response (e.g., the device 100-2).

In general, the network connection capability information includes indications of the network interfaces of the device associated with the response. For example, the network connection capability information can include indications of a network interface, such as, for example, Wi-Fi, WiGig, ZigBee, Bluetooth, Wired, or the like supported by the device. Furthermore, the network connection information can include indication of the underlying attributes of each of the network connection interfaces.

In some examples, the P2P service request 210-*a* includes an information element indicating the response 220-*a* is to include the network connection capability information. For example, Table 1 shown below illustrates an example network connection information element that may be included as part of the 210-*a*.

TABLE 1

Network Connection Information element
(e.g., Extended onto Request)

| Attribute | Note |
|---|---|
| Network Connection Information element | A byte describing information element values in order for the responding device to selectively include/exclude specific information about the network connection capabilities of the device in the response.<br>Bit 0: Set to 1 to indicate to the responder to include network connection information. Set to 0, otherwise.<br>Bits 1-7: Reserved for future use. |

With some examples, the network connection component 122-1 may determine that network connection capability information is not needed. For example, the network connection component 122-1 may determine that the desired use of the P2P network (e.g., file transfer, short duration connection, limited bandwidth connection, or the like) does not necessitate using network connection capability information to establish the P2P network. As such, the network connection component 122-1 may generate the request 210-*a* with the information element set such that the response (e.g., 220-*a*) does not include network connection capability information.

In some examples, the request 210-*a* may be an extension of one or more P2P service discovery protocols. In particular, the request 210-*a* may be an extension of a Wi-Fi Direct Services discovery protocol. With some implementations, the request 210-1 may be communicated (e.g., transmitted) directly to proximate wireless devices 100-*a*. For example, the request 210-1 may have the format of a Probe Request frame and include the information element described above. As another example, the request 210-1 may have the format of a Provision Discovery frame and include the information element described above.

With some implementations, the request 210-2 may be communicated (e.g., transmitted) to proximate wireless devices 100-*a* through the AP 200. For example, the request 210-2 may have the format of a Layer 3 Service Discovery frame and include the information element described above. As another example, the request 220-2 may have the format of any new Action frame and include the information element described above.

As indicated above, upon receiving a request (e.g., the 210-1, the request 210-2, or the like) including the information element (bit 0 set to 1), the wireless device 100-2 can generate the response (e.g., the response 220-1, the response 220-2, or the like) including the network connection capability information.

In some examples, the response 220-*a* includes a list of the network interfaces of the responding device (e.g., the device 100-2) and associated attributes of the listed network interfaces. For example, Tables 2-4 shown below illustrates example network connection information that may be included in the response 220-*a*.

TABLE 2

Network Connection Information (e.g., Extended onto Response)

| Attributes | Note |
|---|---|
| Network Connection Information | A list of network interfaces supported by the responding device and the underlying characteristics of the network connection over each of the network interface. |

In some examples, the network connection information can be specified as a listing of network connection interfaces (refer to Table 3) and an associated network attribute definition for each listed interface (refer to Table 4).

TABLE 3

Network Connection Information (e.g., listing on network interfaces)

| Field | Size (octets) | Value | Description |
|---|---|---|---|
| Attribute ID | 1 | <tbd> | Identifies the type of P2P attribute. |
| Length | 2 | Variable | The total length in octets of this attribute |
| Network Interface Count | 1 | 1-255 | The number of network interfaces, |
| Network Interface Entry list | Variable | Variable | A list of network interface entries to be further defined in Table 4. |

TABLE 4

Network Connection Information (e.g., network interfaces attributes)

| Field | Size (octets) | Value | Description |
|---|---|---|---|
| Length | 1 | variable | The total length of the following fields. |
| MAC Address | 6 | variable | The MAC address of the network interface. |
| Network Connection Option | 1 | variable | Bit 0: set to 0 indicates IPv4 network and set to 1 indicates IPv6 network. Bit 1: set to 0 indicates UDP, set to 1 indicates TCP. Bit 2: set to 1 indicates that the "Number of Hops" field is included. Bit 3: set to 1 indicates that "Bandwidth" field is included. Bit 4: set to 1 indicates that SSID field is included. Bit 5 to Bit 7 are reserved |
| IP Address | 4 or 16 | variable | The IP address assigned to the interface. 4 bytes for IPv4 address, and 16 bytes for IPv6 address. |
| Net Mask | 4 or 16 | variable | The net mask for the subnet. 4 bytes for IPv4 address, and 16 bytes for IPv6 address. |
| Port | 2 | 0-65535 | The listen port. |
| AP MAC Address | 6 | variable | The BSSID of the AP if this interface is connected to the AP. |

TABLE 4-continued

Network Connection Information (e.g., network interfaces attributes)

| Field | Size (octets) | Value | Description |
|---|---|---|---|
| Country String | 3 | variable | The Country String field is set to a value indicating a country code and operating channel. For example, the country code can correspond to the country codes defined in one or more Wi-Fi Alliance and/or IEEE 802.11 standards. |
| Operating Class | 1 | variable | Indicating the frequency band at which the AP is currently operating. |
| Channel Number | 1 | variable | Indicating the channel number on which the AP is currently operating. |
| Number of hops | 1 | variable | Number of elements between the device and the AP. This is optional field. |
| Bandwidth | 2 | variable | Maximum end-to-end bandwidth (in Mbps) between the device and the network edge (AP). This is optional field. |
| SSID | 32 | variable | SSID of the AP to associate with in order to be connected with the Network Interface on the device. This is optional field. |

The network connection capability component 122-1 receives the response 220-a, including the network connection capability information. The P2P network selection component 124-1 may use the network connection capability information indicated in the response 220-a to determine how to connect to the wireless device 100-2. In particular, the P2P network selection component 124-1 can determine a P2P connection type as well as a connection pathway to use to establish a P2P network with the wireless device 100-2.

In some implementations, the P2P network selection component 124-1 may determine to establish a direct P2P connection with the wireless device 100-2. For example, the P2P network selection component 124-1 can determine to establish a P2P network with the wireless device 100-2 using Wi-Fi Direct, Tunneled Direct Link Setup (TDLS), or in general, any connection technology where multiple devices directly connect to form a P2P network.

In some implementations, the P2P network selection component 124-1 may determine to establish an infrastructure P2P connection with the wireless device 100-2. For example, the P2P network selection component 124-1 can determine to establish a P2P network with the wireless device 100-2 using an Access Point (AP) Infrastructure Link, or in general, any connection technology where multiple device connection through another device to form a P2P network.

It is important to note, the present disclosure provides that the wireless device 100-1 may discover the wireless device 100-2 through one connection type (e.g., AP infrastructure using request/response 210-2/220-2) and connect through another P2P network type (e.g., Wi-Fi Direct, or the like). Furthermore, it is important to note, the present disclosure provides for the discovery of devices and their associated network connection capability information and for the establishment of P2P networks between devices where devices in the network are connected (1) directly with each other (e.g., via Wi-Fi Direct, or the like); (2) wirelessly to the wireless AP 200 (e.g., via 802.11 connection, or the like); (3) a hybrid connection where a number of devices are connected to the wireless AP 200 via a wired link and a number of devices are connected to the wireless AP via a wireless link (e.g., 802.11 connection, or the like); and/or (4) a hybrid connection where a number of devices are connected to the wireless AP 200 via a set of network elements (not shown, but may include a wired and/or wireless path between the device and the wireless AP 200) and a number of devices are connected to the wireless AP 200 via a wireless link (e.g., 802.11 connection, or the like).

As a particularly illustrative example, the wireless device 100-1 may discover the wireless device 100-2 via the P2P service request 210-1 and the response with network connection information 220-1. However, based on the network connection capability information indicated in the response 220-1, the wireless device 100-1 may determine (1) that the wireless device 100-2 does not have a spare network interface and (2) the wireless device 100-2 connects to the same wireless AP (e.g., the wireless AP 200) as the wireless device 100-1. As such, the wireless device 100-1 may establish a P2P network with the wireless device 100-2 using, for example, AP infrastructure link.

As another particularly illustrative example, the wireless device 100-1 may discover the wireless device 100-2 via the P2P service request 210-2 and the response with network connection information 220-2. However, based on the network connection capability information indicated in the response 220-2, the wireless device 100-1 may determine (1) the wireless device 100-2 has a spare network interface and (2) the wireless device 100-2 is not connected to the same wireless AP as the wireless device 100-1. As such, the wireless device 100-1 may establish a P2P network with the wireless device 100-2 using, for example, Wi-Fi Direct.

Furthermore, the P2P network selection component 124-1 may determine a number of connection paths to the discovered device (e.g., to the device 100-2) in the case that the current connection to the discovered device does not deliver acceptable performance. More specifically, depending upon the desired use for the P2P network (e.g., file transfer, media streaming, or the like) the performance (e.g., latency, throughput, or the like) of the network paths associated with the available P2P networks may be determined and used to select to the P2P network type and connection path to use to deliver a desirable user experience. More particularly, depending upon the use, network performance thresholds may be used to select the appropriate P2P type and connection path to achieve the desired user experience.

With some examples, the P2P network selection component 124-1 may repeatedly (e.g., on a fixed period, or the like) monitor the network conditions (e.g., latency, bandwidth, or the like) and adjust the P2P network type and/or the connection oath with the wireless device 100-2 to maintain service session continuity despite changing network conditions. Said differently, the P2P network selection component 124-1 can adapt the P2P network type and connection path to provide a consistent user experience despite changing network conditions. With some examples, the P2P network selection component 124-1 may use other information about the network 1000 (e.g., current Wi-Fi load, expected Service Session duration, or the like) to avoid Wi-Fi congestion.

Figure 3:
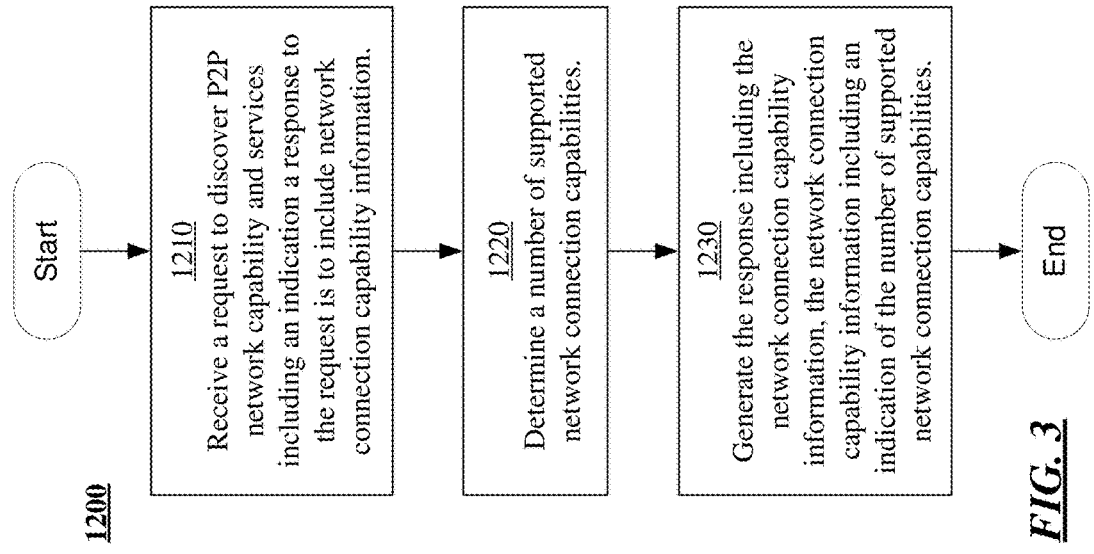
FIGS. 2-3 illustrate logic flows for embodiments of remotely waking a device.
Figure 2:
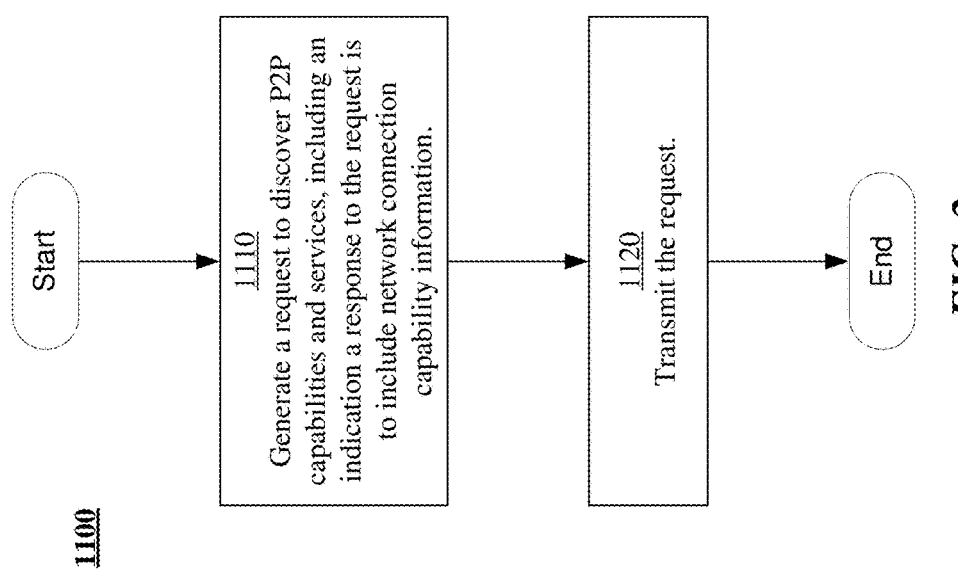

FIGS. 2-3 illustrate examples of logic flows representative of at least some operations executed by one or more logic, features, or devices described herein. In general, the logic flows may be representative of some or all of the operations executed by logic and/or features of the devices 100-a of the network 1000. In particular, FIG. 2 may be representative of operations performed by the wireless device 100-1 in discovering adjacent devices and establishing a P2P network with one of the discovered devices while FIG. 3 may be representative of operations performed by the wireless device 100-2 in receiving a request for P2P connectivity and service capabilities and responding to the request with network connectivity capability information. It is to be appreciated, that although the example logic flows are described with reference to the network 1000 of FIG. 1, this is not intended to be limiting and is merely done for clarity of presentation.

Turning more specifically to FIG. 2, a logic flow 1100 is depicted. The logic flow 1100 may begin at block 1110. At block 1110, "generate a request to discovery P2P capabilities and services, including an indication a response to the request is to include network connectivity capability information" the wireless device 100-1 may generate the request 210-a. In particular, the network connection capability component 122-1 may generate the request 210-1 and/or 210-2 including an information element that indicates a response to the request is to include network connectivity capability information.

Continuing to block 1120, "transmit the request" the wireless device 100-1 may transmit the request. In particular, the network connectivity component 122-1 may transmit the request to adjacent devices (e.g., using the radio 112-1 and the antenna 132-1).

Furthermore, the network connectivity component 122-1 may receive a response to the request (e.g., the response 220-1 and/or 220-2). Additionally, the P2P network selection component 124-1 may (1) determine an appropriate P2P network type and connection path based on the network connectivity capability information indicated in the response 220-a; and (2) establish a P2P network based on the determined P2P network type and connection path.

Turning more specifically to FIG. 3, a logic flow 1200 is depicted. The logic flow 1200 may begin at block 1210. At block 1210, "receive a request to discovery P2P capabilities and services, including an indication a response to the request is to include network connectivity capability information" the wireless device 100-2 may receive the request 210-a. In particular, the network connection capability component 122-2 may receive the request 210-1 and/or 210-2 including an information element that indicates a response to the request is to include network connectivity capability information.

Continuing to block 1220, "determine a number of supported network connection capabilities" the wireless device 100-2 may determine network connection capabilities supported by the device. In particular, the network connection component 122-2 may determine network interfaces and underlying attributes of the network interfaces supported and/or included in the wireless device 100-2.

Continuing to block 1230, "generate the response including the network connection capability information, the network connection capability information including an indication of the supported network connection capabilities" the wireless device 100-2 may generate the response 220-a. In particular, the network connection capability component 122-2 may generate the response 220-1 and/or 220-2 including the indication of the network connection capability information. In some examples, the network connection capability information includes a listing of the network interfaces of the wireless device 100-2 and the attributes of each of the network interfaces.

Figure 4:
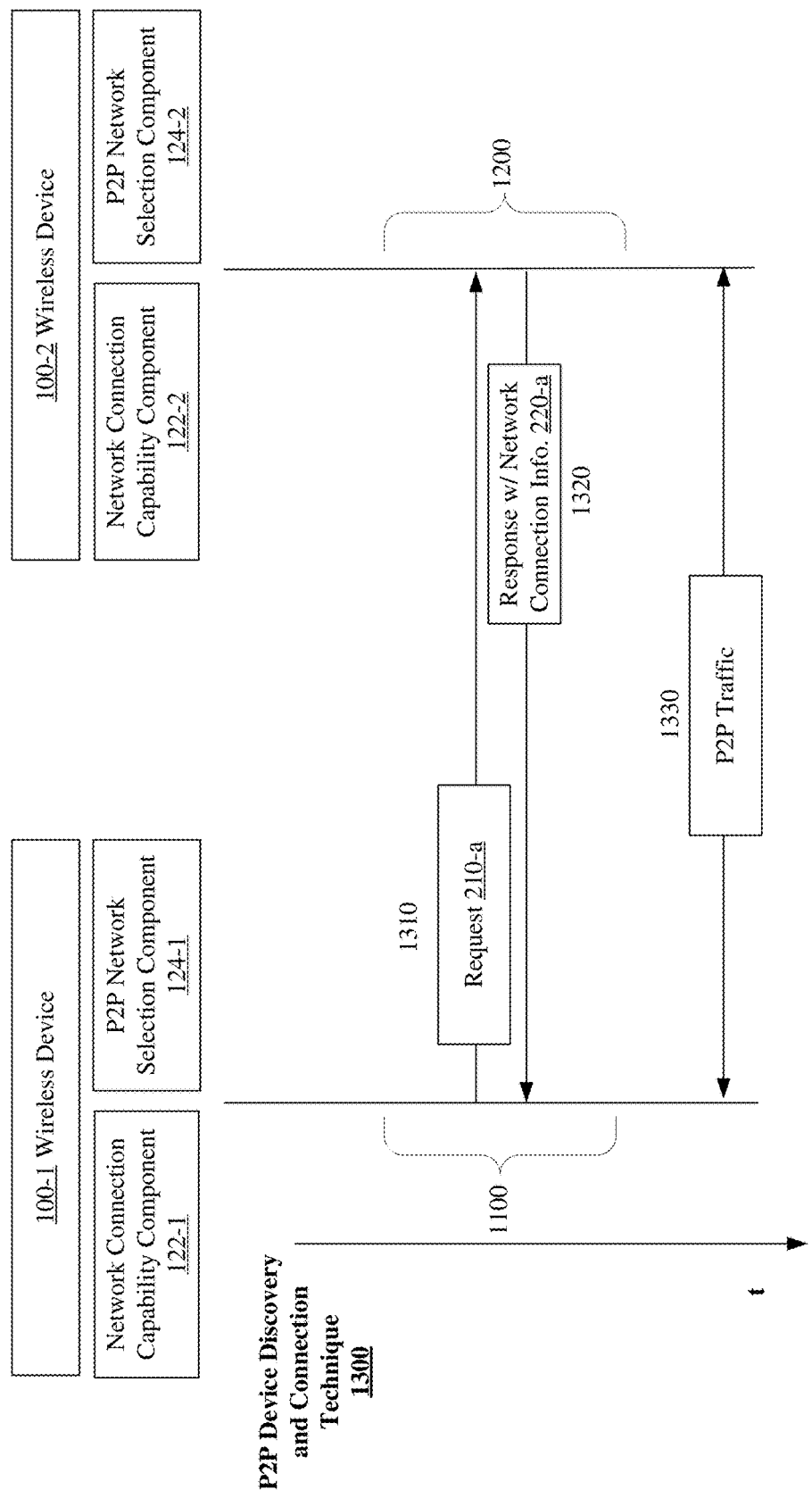
FIG. 4 illustrates one embodiment of a remote wakeup technique.

FIG. 4 illustrates a P2P device discovery and connection technique 1300 that may be implemented by computing devices to discovery adjacent devices P2P services and capabilities and to establish a P2P connection with one of the discovered devices based on network capability information of the discovered devices. In some examples, the wireless device 100-a may perform the technique 1300. In particular, the acts depicted in the technique 1300 may be representative of acts such as may be performed by the wireless device 100-1 and the wireless device 100-2 in order to discover each other and establish a P2P connection based in part on network connection capabilities.

In the technique 1300 communications are exchanged between the devices 100-1 and 100-2. In general, at 1310, the wireless device 100-1 generates a request 210-a, which includes an indication (e.g., information element, or the like) that a response to the request is to include network connection capability information. The request 210-a is transmitted to adjacent devices (e.g., directly, indirectly, or the like). For example, the network connection capability component 122-1 may generate and transmit the request 210-a.

The wireless device 100-2 may receive the request. In particular, the network connection capability component 122-2 may receive the request 210-1. Additionally, at 1320, the wireless device 100-2 may respond to the request 210-a. In particular, the network connection capability component 122-2 may determine network connection capabilities of the device 100-2 and generate the response 220-a including network connection capability information, the network connection capability information including indications of the determined network connection capabilities.

In general, at 1330, based on the request 210-a and the response 220-a, the devices 100-1 and 100-2 may establish a P2P network connection most suitable for the intended use based on the network connection capability information. In particular, the network connection capability component 122-1 may receive the response 220-a. The P2P network selection component 124-1 may select a P2P network connection type and connection pathway based on the network connection information. More specifically, the network connection capability information may include indications of the network interfaces of the device 100-2 and the associated attributes of the network interfaces. The P2P network selection component 124-1 may determine a P2P network connection type (e.g., Wi-Fi Direct, TDLS, AP Infrastructure Link, or the like) and a connection pathway (e.g., wireless, hybrid wired, or the like) based on the network interfaces and the attributes of the network interfaces.

Figure 5:
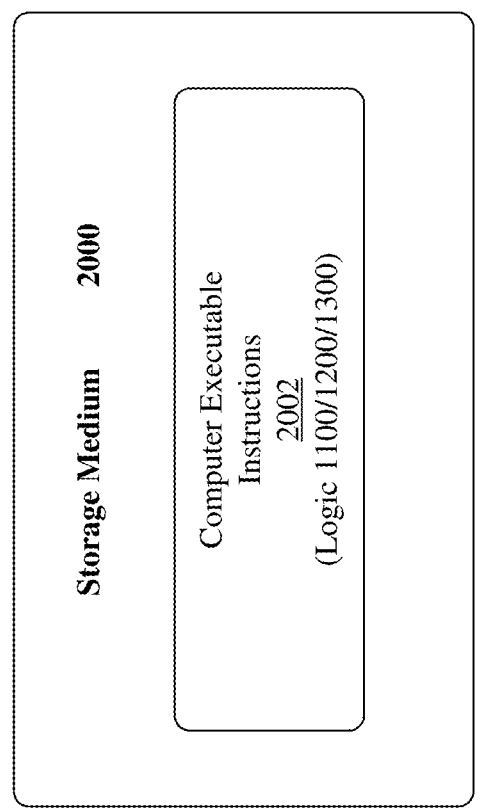
FIG. 5 illustrates one embodiment of a storage medium.

FIG. 5 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 1100. In some examples, the storage medium 2000 may store various types of computer executable instructions to implement logic flow 1200. In some examples, the storage medium 2000 may store various types of computer executable instructions to implement acts associated with at least part of the technique 1300.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
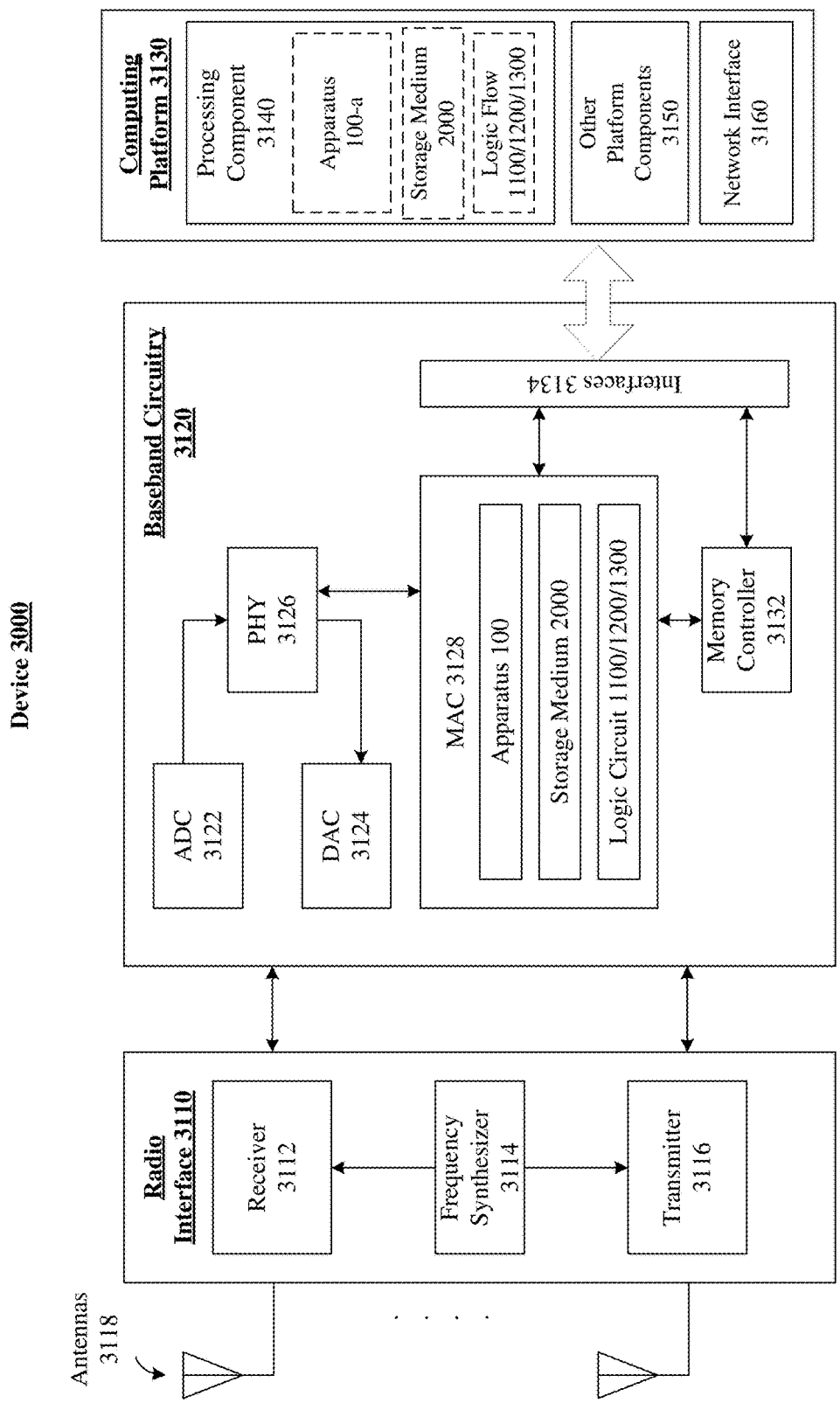
FIG. 6 illustrates one embodiment of a device.

FIG. 6 illustrates an embodiment of a device 3000. In some examples, device 3000 may be configured or arranged for wireless communications in a wireless network and/or a P2P network, such that the network 1000 shown in FIG. 1. In some examples, one of the devices 100-a may be implemented in the device 3000. For example, the device 3000 may implement the device as apparatus 100-a. Additionally, the device 3000 may implement storage medium 2000 and/or a logic circuit 1100/1200/1300. The logic circuits may include physical circuits to perform operations described for the apparatus 100-a, storage medium 2000, logic flow 1100, logic flow 1200, and/or at least a portion of the logic flow 1300. As shown in FIG. 6, device 3000 may include a radio interface 3110, baseband circuitry 3120, and computing platform 3130, although examples are not limited to this configuration.

The device 3000 may implement some or all of the structure and/or operations for the apparatus 100-a, the storage medium 2000 and/or the logic circuit 1100/1200/1300 in a single computing entity, such as entirely within a single device. The embodiments are not limited in this context.

Radio interface 3110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 3110 may include, for example, a receiver 3112, a transmitter 3116 and/or a frequency synthesizer 3114. Radio interface 3110 may include bias controls, a crystal oscillator and antennas 3118-1 to 3118-f. In another embodiment, radio interface 3110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 3120 may communicate with radio interface 3110 to process receive and/or transmit signals and may include, for example, an analog-to-digital converter 3122 for down converting received signals, a digital-to-analog converter 3124 for up converting signals for transmission. Further, baseband circuitry 3120 may include a baseband or physical layer (PHY) processing circuit 3126 for PHY link layer processing of respective receive/transmit signals. Baseband circuitry 3120 may include, for example, a processing circuit 3128 for medium access control (MAC)/ data link layer processing. Baseband circuitry 3120 may include a memory controller 3132 for communicating with MAC processing circuit 3128 and/or a computing platform 3130, for example, via one or more interfaces 3134.

In some embodiments, PHY processing circuit 3126 may include a frame construction and/or detection module, in combination with additional circuitry such as a buffer memory, to construct and/or deconstruct communication frames (e.g., containing subframes). Alternatively or in addition, MAC processing circuit 3128 may share processing for certain of these functions or perform these processes independent of PHY processing circuit 3126. In some embodiments, MAC and PHY processing may be integrated into a single circuit.

Computing platform 3130 may provide computing functionality for device 3000. As shown, computing platform 3130 may include a processing component 3140. In addition to, or alternatively of, baseband circuitry 3120 of device 3000 may execute processing operations or logic for the apparatus 100*a*, storage medium 2000, and logic circuits 1100/1200/1300 using the processing component 3130. Processing component 3140 (and/or PHY 3126 and/or MAC 3128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 3130 may further include other platform components 3150. Other platform components 3150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 3130 may further include a network interface 3160. In some examples, network interface 3160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 3000 may be part of a device in a P2P network and may be included in various types of computing devices to include, but not limited to, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 2000 described herein; may be included or omitted in various embodiments of device 2000, as suitably desired. In some embodiments, device 2000 may be configured to be compatible with protocols and frequencies associated with IEEE 802.11 Standards or Specification and/or 3GPP Standards or Specifications for MIMO systems, although the examples are not limited in this respect.

The components and features of device 3000 may be implemented using any combination of discrete circuitry, application specific integrated circuits (ASICs), logic gates and/or single chip architectures. Further, the features of device 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 3000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 7:
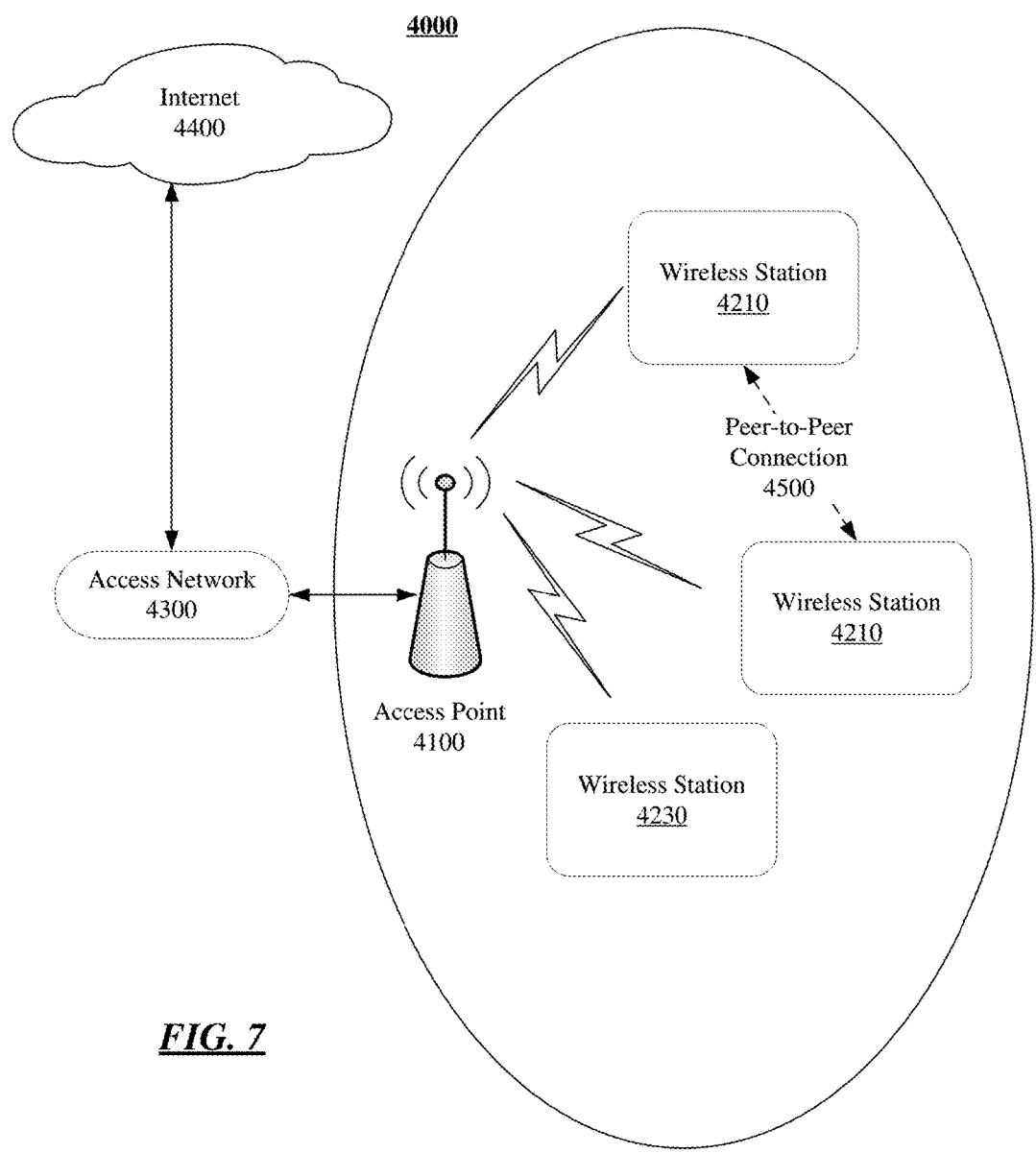
FIG. 7 illustrates one embodiment of a wireless network.

FIG. 7 illustrates an embodiment of a wireless network 4000. As shown in FIG. 7, wireless network 4000 comprises an access point 4100 and wireless stations 4210, 4220, and 4230. In various embodiments, wireless network 4000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 4000 may comprise another type of wireless network, and/or may implement other wireless communications standards. In various embodiments, for example, wireless network 4000 may comprise a WWAN or WPAN rather than a WLAN. The embodiments are not limited to this example.

In various embodiments, wireless stations 4210, 4220, and 4230 may communicate through access point 4100 in order to obtain connectivity to one or more external data networks. In some embodiments, for example, wireless stations 4210, 4220, and 4230 may connect to the Internet 4400 via access point 4100 and access network 4300. In various embodiments, access network 4300 may comprise a private network that provides subscription-based Internet-connectivity, such as an Internet Service Provider (ISP) network. The embodiments are not limited to this example.

In various embodiments, two or more of wireless stations 4210, 4220, and 4230 may communicate with each other directly and/or through access point 4100 in order to obtain P2P connectivity and service capabilities and network connectivity capability information for the purpose of exchanging peer-to-peer communications. For example, as depicted in FIG. 7, wireless stations 4210 and 4220 communicate with each other directly by exchanging peer-to-peer communications 4500. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. In various embodiments, such peer-to-peer communications may be performed according to the MFA NAN protocol. The embodiments are not limited to these examples.

Various examples described herein may be provided to enable one or more of the wireless stations (e.g., the station 4210) to wake another of the wireless stations (e.g., the station 4220) in order to communicate in the peer-to-peer communication 4500. More specifically, one of the stations may be a controlling station (e.g., the controlling device 100-1) while another of the stations may be a controlled station (e.g., the controlled device 100-2). As such, the controlling device may wake the controlled device from a sleep or low power state as described herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose might be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The detailed disclosure now turns to providing examples that pertain to further embodiments. The examples provided below are also not intended to be limiting.

Example 1

An apparatus for a device in a wireless network, the apparatus including circuitry; and a network connection capability component executable by the circuitry, the network connection capability component to transmit a request to discover peer-to-peer (P2P) network capability and services, the request to include an indication that a response to the request is to include network connection capability information, the network connection capability information to include an indication of one or more network connection capabilities of a P2P device associated with the response.

Example 2

The apparatus of example 1, comprising a P2P network selection component executable by the circuitry, the P2P network selection component to determine a P2P network to establish based on the network connection information.

Example 3

The apparatus of example 2, the network connection capability component to receive the response from the P2P device.

Example 4

The apparatus of example 1, the network connection component to send a control directive to power on a radio to transmit the request.

Example 5

The apparatus of any one of examples 1 to 4, wherein the request includes an information element, the information element indicating the response is to include the network connection capability information.

Example 6

The apparatus of example 5, wherein the request has the format of a probe request frame, a provision discovery request frame, or a layer 3 service discovery frame.

Example 7

The apparatus of any one of examples 1 to 4, wherein the response has the format of probe response frame, a provision discovery response frame, or a layer 3 service discovery response frame.

Example 8

The apparatus of example 2, the P2P network selection component to determine one or more P2P connection capabilities supported by the P2P device based on the response frame.

Example 9

The apparatus of example 8, the P2P network selection component to determine a P2P network connection path to use to establish the P2P network based on the one or more supported P2P connection capabilities and the one or more network connection capabilities.

Example 10

The apparatus of example 9, the P2P network selection component to determine network performance characteristics corresponding to the one or more network connection capabilities and to determine an alternative P2P network connection path based on the determined network performance characteristics.

Example 11

The apparatus of any one of examples 8 to 10, wherein the one or more P2P connection capabilities are selected from the group consisting of Wi-Fi Direct, Tunneled Direct Link Setup (TDLS), and Access Point (AP) Infrastructure Link.

Example 12

The apparatus of example 11, the P2P network connection path or the alternative P2P network connection path comprising a direct wireless connection, a multi-hop wireless connection, a hybrid multi-hop wireless and wired connection.

Example 13

The apparatus of any one of examples 1 to 12, the circuitry to comprise an application processor.

Example 14

The apparatus of any one of examples 1 to 12, the circuitry to comprise a baseband processor.

Example 15

The apparatus of example 1, comprising a radio operably coupled to the circuitry, and one or more antennas operably coupled to the radio, the radio to communicate the request to the P2P device via the one or more antennas as radio-frequency (RF) signals.

Example 16

An apparatus for a device in a wireless network, the apparatus including circuitry; and a network connection capability component executable by the circuitry, the network connection capability component to receive a request to discover peer-to-peer (P2P) network capability and services from a P2P device, the request to include an indication that a response to the request is to include network connection capability information; determine one or more supported network connection capabilities; and generate the response to include the network connection capability information, the network connection capability information to include an indication of the one or more supported network connection capabilities.

Example 17

The apparatus of example 16, the network connection capability component to communicate the response to the P2P device.

Example 18

The apparatus of example 17, the network connection component to send a control directive to power on a radio to communicate the response.

Example 19

The apparatus of any one of examples 16 to 18, the network connection component to determine one of more network interfaces associated with the apparatus and for each of the one or more network interfaces, identify a plurality of network interface attributes.

Example 20

The apparatus of example 19, the network connection component to generate the response to include an indication of the determined one or more network interfaces and for each of the one or more network interfaces, the plurality of identified network interface attributes.

Example 21

The apparatus of any one of examples 16 to 18, wherein the request includes an information element, the information element indicating the response is to include the network connection capability information.

Example 22

The apparatus of example 21, wherein the request has the format of a probe request frame, a provision discovery request frame, or a layer 3 service discovery frame.

Example 23

The apparatus of any one of examples 16 to 18, wherein the response has the format of probe response frame, a provision discovery response frame, or a layer 3 service discovery response frame.

Example 24

The apparatus of any one of examples 16 to 18, the network connection component to determine one or more supported P2P connection capabilities and to generate the response to include an indication of the one or more supported P2P connection capabilities.

Example 25

The apparatus of example 24, wherein the one or more supported P2P connection capabilities are selected from the group consisting of Wi-Fi Direct, Tunneled Direct Link Setup (TDLS), and Access Point (AP) Infrastructure Link.

Example 26

The apparatus of one of examples 16 to 25, the circuitry to comprise an application processor.

Example 27

The apparatus of any one of examples 16 to 25, the circuitry to comprise a baseband processor.

Example 28

The apparatus of claim 16, comprising an a radio operably coupled to the circuitry, and one or more antennas operably coupled to the radio, the radio to communicate the response to the P2P device via the one or more antennas as radio-frequency (RF) signals.

Example 29

A method implemented by a device in a wireless network, the method including generate a request to discover peer-to-peer (P2P) network capability and services, the request to include an indication that a response to the request is to include network connection capability information, the network connection capability information to include an indication of one or more network connection capabilities of a P2P device associated with the response; and transmit the request using a radio.

Example 30

The method of example 29, comprising receiving the response from the P2P device.

Example 31

The method of example 30, comprising determining a P2P network to establish based on the network connection information.

Example 32

The method of example 29, comprising sending a control directive to power on the radio to transmit the request.

Example 33

The method of any one of examples 29 to 32, wherein the request includes an information element, the information element indicating the response is to include the network connection capability information.

Example 34

The method of example 33, wherein the request has the format of a probe request frame, a provision discovery request frame, or a layer 3 service discovery frame.

Example 35

The method of any one of examples 29 to 32, wherein the response has the format of probe response frame, a provision discovery response frame, or a layer 3 service discovery response frame.

Example 36

The method of example 35, comprising determining one or more P2P connection capabilities supported by the P2P device based on the response frame.

Example 37

The method of example 36, comprising determining a P2P network connection path to use to establish the P2P network based on the one or more supported P2P connection capabilities and the one or more network connection capabilities.

Example 38

The method of example 37, comprising determining network performance characteristics corresponding to the one or more network connection capabilities and to determine an alternative P2P network connection path based on the determined network performance characteristics.

Example 39

The method of any one of examples 36 to 38, wherein the one or more P2P connection capabilities are selected from the group consisting of Wi-Fi Direct, Tunneled Direct Link Setup (TDLS), and Access Point (AP) Infrastructure Link.

Example 40

The method of example 39, the P2P network connection path or the alternative P2P network connection path comprising a direct wireless connection, a multi-hop wireless connection, a hybrid multi-hop wireless and wired connection.

Example 41

An method implemented by a device in a wireless network, the method including receiving a request to discover peer-to-peer (P2P) network capability and services from a P2P device, the request to include an indication that a response to the request is to include network connection capability information; determining one or more supported network connection capabilities; and generating the response to include the network connection capability information, the network connection capability information to include an indication of the one or more supported network connection capabilities.

Example 42

The method of example 41, comprising communicating the response to the P2P device.

Example 43

The method of example 42, comprising sending a control directive to power on a radio to communicate the response.

Example 44

The method of any one of examples 41 to 43, comprising determining one of more network interfaces associated with the apparatus and for each of the one or more network interfaces, identifying a plurality of network interface attributes.

Example 45

The method of example 44, comprising generating the response to include an indication of the determined one or more network interfaces and for each of the one or more network interfaces, the plurality of identified network interface attributes.

Example 46

The method of any one of examples 41 to 43, wherein the request includes an information element, the information element indicating the response is to include the network connection capability information.

Example 47

The method of example 46, wherein the request has the format of a probe request frame, a provision discovery request frame, or a layer 3 service discovery frame.

Example 48

The method of any one of examples 41 to 43, wherein the response has the format of probe response frame, a provision discovery response frame, or a layer 3 service discovery response frame.

Example 49

The method of any one of examples 41 to 43, including determining one or more supported P2P connection capabilities; and generating the response to include an indication of the one or more supported P2P connection capabilities.

Example 50

The method of example 49, wherein the one or more supported P2P connection capabilities are selected from the group consisting of Wi-Fi Direct, Tunneled Direct Link Setup (TDLS), and Access Point (AP) Infrastructure Link.

Example 51

At least one machine readable medium comprising a plurality of instructions that in response to being executed on a device in a wireless network cause the device to perform the method of any of examples 29 to 50.

Example 52

An apparatus for a wireless network including a processor; a radio operably connected to the processor; one or more antennas operably connected to the radio to transmit or receive wireless signals; and a memory comprising a plurality of instructions that in response to being executed by the processor cause the processor or the radio to perform the method of any of examples 29 to 50.

The invention claimed is:

1. An apparatus for a device in a wireless network, the apparatus comprising:
   circuitry;
   a network connection capability component executable by the circuitry, the network connection capability component to:
      transmit a request to discover peer-to-peer (P2P) network information, the request to include an indication that a response to the request is to include network connection capability information of a P2P device associated with the response, the network connection capability information comprising a plurality of network interfaces supported by the P2P device and one or more network interface attributes providing at least one underlying characteristic of a network connection over at least one of the plurality of network interfaces, and
      receive a response from the P2P device, the response to include the network connection capability information; and
   a P2P network selection component executable by the circuitry, the P2P network selection component to determine at least one connection path of a plurality of available connection paths between the device and the P2P device based on the network connection capability information.

2. The apparatus of claim 1, the P2P network selection component to determine a P2P network to establish based on the network connection capability information.

3. The apparatus of claim 2, the P2P network selection component to determine one or more P2P connection types supported by the P2P device based on the network connection capability information.

4. The apparatus of claim 1, the P2P network selection component to determine network performance characteristics corresponding to the one or more P2P network connection paths and to determine an alternative P2P network connection path based on the determined network performance characteristics.

5. The apparatus of claim 4, the at least one connection path between the device and the P2P device comprising a direct wireless connection, a multi-hop wireless connection, a hybrid multi-hop wireless and wired connection.

6. The apparatus of claim 1, wherein the plurality of network interfaces are selected from the group consisting of Wi-Fi Direct, Tunneled Direct Link Setup (TDLS), and Access Point (AP) Infrastructure Link.

7. The apparatus of claim 1, comprising a P2P network selection component executable by the circuitry, the P2P network selection component to determine whether the P2P device has a spare network interface based on the network connection capability information.

8. The apparatus of claim 1, comprising a P2P network selection component executable by the circuitry, the P2P network selection component to determine whether the device and the P2P device are connected to a same access point based on the network connection capability information.

9. The apparatus of claim 1, the P2P network selection component to determine the at least one connection path based on a use for the connection.

10. The apparatus of claim 9, the use comprising one of file transfer or media streaming.

11. The apparatus of claim 1, the network connection capability component to:
   determine whether the network connection capability information is needed based on a use of the at least one connection path,
   generate the request to include the indication that the response to the request is not to include the network connection capability information responsive to determining that the network connection capability information is not needed, and
   generate the request to include the indication that the response to the request is to include the network connection capability information responsive to determining that the network connection capability information is needed.

12. An apparatus for a device in a wireless network, the apparatus comprising:
   circuitry;
   a network connection capability component executable by the circuitry, the network connection capability component to:
      receive a request to discover peer-to-peer (P2P) network information from a P2P device, the request including an indication that a response to the request is to include network connection capability information of the device, the network connection capability information indicating a plurality of network interfaces supported by the device and one or more network interface attributes providing at least one underlying characteristic of a network connection over at least one of the one or more network connection interfaces, and
      generate the response including the network connection capability information, the network connection capability information including an indication of the plurality of network interfaces and one or more network interface attributes; and
   at least one radio to establish a connection with the P2P device via at least one connection path determined from a plurality of available connection paths between the device and the P2P device by the P2P device based on the network connection capability information.

13. The apparatus of claim 12, the network connection capability component to determine the plurality of network interfaces associated with the apparatus and for each of the plurality of network interfaces, identify the one or more network interface attributes.

14. The apparatus of claim 12, the network connection component to determine the plurality of network interfaces and for each of the plurality of network interfaces, identify the one or more network interface attributes.

15. A method implemented by a device in a wireless network, the method comprising:
generating a request to discover peer-to-peer (P2P) network information, the request including an indication that a response to the request is to include network connection capability information of a P2P device associated with the response, the network connection capability information comprising a plurality of network interfaces supported by the P2P device and one or more network interface attributes providing at least one underlying characteristic of a network connection over at least one of the plurality of network interfaces;
transmitting the request using a radio, wherein the request includes an information element, the information element indicating that the response is to include the network connection capability information;
receiving a response from the P2P device, the response to include the network connection capability information; and
determining at least one connection path of a plurality of available connection paths between the device and the P2P device based on the network connection capability information.

16. The method of claim 15, comprising determining a P2P network to establish based on the network connection capability information.

17. The method of claim 15, comprising determining network performance characteristics corresponding to the one or more P2P network connection-paths and to determine an alternative P2P network connection path based on the determined network performance characteristics.

18. The method of claim 15, comprising determining whether the P2P device has a spare network interface based on the network connection capability information.

19. The method of claim 15, comprising determining whether the device and the P2P device are connected to the same access point based on the network connection capability information.

20. The method of claim 15, comprising determining the at least one connection path based on a use for the connection.

21. At least one non-transitory machine readable medium comprising a plurality of instructions that in response to being executed on a device in a wireless network cause the device to:
receive a request to discover peer-to-peer (P2P) network information from a P2P device, the request including an indication a response to the request is to include network connection capability information of the device, the network connection capability information indicating a plurality of network interfaces supported by the device and one or more network interface attributes providing at least one underlying characteristic of a network connection over at least one of the plurality of network interfaces;
generate the response including the network connection capability information, the network connection capability information including an indication of the plurality of and one or more network interface attributes; and
establishing a connection with the P2P device via at least one connection path determined from a plurality of available connection paths between the device and the P2P device by the P2P device based on the network connection capability information.

22. The at least one non-transitory machine readable medium of claim 21, the instructions that in response to being executed on the device further cause the device to:
determine one of more network interfaces associated with the apparatus and for each of the plurality of network interfaces, identifying a plurality of network interface attributes.

23. The at least one non-transitory machine readable medium of claim 21, wherein the response has a format of a probe response frame, a provision discovery response frame, or a layer 3 service discovery response frame.

* * * * *